United States Patent
Chatterton et al.

(10) Patent No.: US 7,777,131 B2
(45) Date of Patent: Aug. 17, 2010

(54) COMPOSITION AND METHOD FOR RESTORING AN ELECTRICAL CABLE AND INHIBITING CORROSION IN THE ALUMINUM CONDUCTOR CORE

(75) Inventors: Wayne J. Chatterton, Linwood, MI (US); James Steele, Seattle, WA (US); William R. Stagi, Burien, WA (US)

(73) Assignee: Utilx Corporation, Kent, WA (US)

( * ) Notice: Subject to any disclaimer, the term of this patent is extended or adjusted under 35 U.S.C. 154(b) by 413 days.

(21) Appl. No.: 11/965,544

(22) Filed: Dec. 27, 2007

(65) Prior Publication Data

US 2008/0169450 A1  Jul. 17, 2008

Related U.S. Application Data

(63) Continuation of application No. PCT/US2007/08641, filed on Dec. 4, 2007.

(60) Provisional application No. 60/884,837, filed on Jan. 12, 2007.

(51) Int. Cl.
*H01B 3/20* (2006.01)
*H01B 13/22* (2006.01)
*B32B 43/00* (2006.01)
*B05D 1/00* (2006.01)

(52) U.S. Cl. .................. 174/25 P; 174/25 C; 174/25 R; 174/120 R; 174/119 C; 427/117; 427/118; 427/140; 427/387

(58) Field of Classification Search ............... 174/25 C, 174/25 P; 427/117, 118, 387
See application file for complete search history.

(56) References Cited

U.S. PATENT DOCUMENTS

| | | | |
|---|---|---|---|
| 4,395,563 A | | 7/1983 | Hayes |
| 4,514,536 A | * | 4/1985 | Braus et al. ............... 524/261 |
| 4,548,865 A | * | 10/1985 | Braus et al. ............... 428/379 |
| 4,608,306 A | * | 8/1986 | Vincent .................... 428/391 |
| 4,766,011 A | | 8/1988 | Vincent |
| 5,175,332 A | * | 12/1992 | Chatterton et al. ......... 556/482 |
| 5,200,234 A | | 4/1993 | Bertini |
| 5,372,840 A | | 12/1994 | Kleyer |
| 5,372,841 A | | 12/1994 | Kleyer |
| 6,160,151 A | | 12/2000 | Compton et al. |
| 6,232,376 B1 | | 5/2001 | Tsukada et al. |
| 6,350,947 B1 | | 2/2002 | Bertini |
| 6,355,879 B1 | | 3/2002 | Bertini |
| 6,489,554 B1 | | 12/2002 | Bertini |
| 6,697,712 B1 | | 2/2004 | Bertini |
| 7,615,247 B2 | * | 11/2009 | Bertini et al. ............ 427/117 |
| 2005/0189130 A1 | | 9/2005 | Bertini |
| 2005/0192708 A1 | | 9/2005 | Bertini |
| 2006/0270787 A1 | | 11/2006 | Teff et al. |
| 2008/0173467 A1 | * | 7/2008 | Bertini et al. ............ 174/25 C |
| 2009/0032088 A1 | * | 2/2009 | Rabinowitz ............... 136/251 |
| 2009/0114882 A1 | * | 5/2009 | Cook et al. ............... 252/396 |
| 2009/0133799 A1 | * | 5/2009 | Bertini .................... 156/47 |
| 2009/0176960 A1 | * | 7/2009 | Bertini et al. ............ 528/31 |

FOREIGN PATENT DOCUMENTS

| | | |
|---|---|---|
| EP | 0 274 101 B1 | 7/1988 |
| EP | 0 621 607 B1 | 10/1994 |
| EP | 0 621 608 B1 | 10/1994 |
| WO | 2005/124792 A1 | 12/2005 |
| WO | 2006/119196 A1 | 11/2006 |

OTHER PUBLICATIONS

McMahon, E.J., "A Tree Growth Inhibiting Insulation for Power Cable," IEEE Transactions on Electrical Insulation EI-16(4):2-16, Aug. 1981.
Morrison, R.T., and R.N. Boyd, "Organic Chemistry" 3d ed., Allyn and Bacon, Boston, 1973, pp. 495 and 526.
"Restore Life to 'Treed' Cables," Electrical World, Jun. 1984, pp. 83-84.

* cited by examiner

*Primary Examiner*—Joseph D Anthony
(74) *Attorney, Agent, or Firm*—Christensen O'Connor Johnson Kindness PLLC

(57) ABSTRACT

Composition and method for enhancing the dielectric strength of an in-service solid dielectric shielded electrical cable and preventing corrosion of a central aluminum conductor of the cable by supplying the cable with an alkoxysilane composition. In one embodiment, the alkoxysilane composition includes dimethyldi(n-butoxy)silane.

18 Claims, No Drawings

COMPOSITION AND METHOD FOR RESTORING AN ELECTRICAL CABLE AND INHIBITING CORROSION IN THE ALUMINUM CONDUCTOR CORE

CROSS-REFERENCES TO RELATED APPLICATIONS

This application is a continuation of PCT/US2007/08641, filed Dec. 4, 2007, which claims the benefit of U.S. Provisional Application No. 60/884,837, filed Jan. 12, 2007. Each application is expressly incorporated herein by reference in its entirety.

BACKGROUND OF THE INVENTION

Typical solid dielectric shielded electrical cables include a number of copper or aluminum strands surrounded by a semi-conducting or insulating strand shield, a layer of insulation, and an insulation shield. This design of solid dielectric shielded cables is known for having a useful life of 25-40 years. In some instances, the life span of a solid dielectric shielded cable is shortened when water enters the cable and forms micro-voids in the insulation layer. These micro-voids develop throughout the insulation layer in a tree-like shape, collections of which are sometimes referred to as water trees.

Water trees are known to form in the insulation layer of electrical cables when medium to high voltage alternating current is applied to a polymeric dielectric (insulator) in the presence of water and ions. As water trees grow, they compromise the dielectric properties of the polymer until the insulation layer fails. Many large water trees initiate at the site of an imperfection or a contaminant, but contamination is not a necessary condition for water trees to propagate.

Water tree growth can be eliminated or retarded by removing or minimizing the water or ions, or by reducing the voltage stress. Another approach requires the injection of dielectric enhancement fluid from an external fluid source into interstices located between the strands of the cables. U.S. Pat. No. 5,907,128 provides a detailed description of such an approach. The fluid reacts with water inside the cable and oligomerizes to form a fluid with dielectric enhancement properties. The oligomerized fluid functions as a water tree retardant and provides other beneficial properties.

One drawback to the injection of dielectric enhancement fluid is that conventional fluids produce alcohol in the process of reacting with water inside the cable. Over time and under certain conditions, the alcohols produced by the hydrolysis of the currently used dielectric enhancement fluids, under certain conditions, may cause corrosion of the cable's central aluminum conductor.

Despite the advances made in remediating electrical cables through the use of dielectric enhancement fluids, a need exists for an improved dielectric enhancement fluid that cannot result in corrosion of the cable's central conductor. The present invention seeks to fulfill this need and provides further related advantages.

SUMMARY OF THE INVENTION

The present invention provides compositions and methods for restoring an in-service solid dielectric shielded electrical cable and preventing corrosion in the central aluminum core.

In one aspect, the present invention provides a method for enhancing the dielectric strength of an in-service solid dielectric shielded electrical cable while at the same time preventing corrosion of the central conductor of the cable. In one embodiment, the method includes supplying the interstitial void volume in the region of the conductor with an alkoxysilane composition. The composition includes an alkoxysilane that is hydrolyzable in the void volume and produces an alcohol that is non-corrosive to the central conductor at temperatures up to and exceeding maximum cable operating temperatures of about 100° C.

In another aspect of the invention, a composition for enhancing the dielectric strength of an in-service solid dielectric shielded electrical cable is provided. In one embodiment, the composition is an alkoxysilane composition that includes an alkoxysilane that is hydrolyzable in the cable and produces an alcohol that is non-corrosive to the central conductor at temperatures up to and including about 100° C. In one embodiment, the composition includes dimethyldi(n-butoxy)silane.

DETAILED DESCRIPTION OF THE INVENTION

The present invention provides compositions and methods for enhancing the dielectric strength of an in-service solid dielectric shielded electrical cable while at the same time preventing corrosion of the cable's central conductor.

In one aspect, the invention provides a method for enhancing the dielectric strength of an in-service solid dielectric shielded electrical cable. In-service solid dielectric shielded electrical cables include a central conductor encased in an insulation jacket and include an interstitial void volume in the region of the conductor. In one embodiment of the method, the interstitial void volume is supplied with an alkoxysilane composition to enhance the dielectric strength of the cable. Devices and methods for introducing a dielectric enhancement fluid into an in-service solid dielectric shielded electrical cable are known in the art. For example, U.S. Pat. No. 5,907,128 provides a description for injecting dielectric enhancement fluid from an external fluid source into interstices located between strands of the cable. U.S. Pat. No. 6,697,712 describes a distributed cable feed system and method for introducing dielectric enhancement fluid to an in-service cable. Each of these patents and application are incorporated by reference in their entirety.

In the method, an alkoxysilane composition is supplied to the interstitial void volume of the cable in the region of the conductor. The alkoxysilane composition includes an alkoxysilane that is hydrolyzable in the volume to produce an alcohol, the mixture of the alkoxysilane and the hydrolysis products including the alcohol, is non-corrosive to the central conductor at temperatures up to and including about 100° C., the temperature achieved by certain electrical cables during use.

Methanol and ethanol are alcohols produced by dielectric enhancement fluids (e.g., dimethyldimethoxysilane, dimethyldiethoxysilane, phenylmethyldimethoxysilane) traditionally used to remediate in-service solid dielectric shielded electrical cables. Although dielectric enhancement fluids that produce methanol and ethanol are initially advantageously useful in enhancing the dielectric strength of the cable, because these fluids produce alcohols that under some circumstances that may exist in a cable system are corrosive to the cable, corrosion problems may arise and have arisen in practice when such enhancement fluids are used. Corrosion caused by these alcohols is a greater problem at elevated temperatures approaching the boiling point of the alcohols their reactions produce. The alkoxysilane composition useful in the method of the invention does not include an alkoxysilane that produces an alcohol (e.g., methanol or ethanol) that is corrosive to the central conductor at temperatures through the standard operating range of the cable up to and including about 100° C.

In one embodiment, the alkoxysilane composition useful in the method of the invention includes a dialkoxysilane having the formula:

wherein $R_1$ and $R_2$ are independently selected from the group consisting of $C_4$ and $C_5$ alkyl groups; and wherein $R_3$ and $R_4$ are independently selected from the group consisting of $C_1$ alkyl, $C_2$ alkyl, $C_3$ alkyl, phenyl, and tolyl groups.

$C_4$ alkyl groups include n-butyl, s-butyl, and i-butyl groups. $C_5$ alkyl groups include n-pentyl, s-pentyl, and i-pentyl groups.

In one embodiment, $R_1$ and $R_2$ are n-butyl groups.
In one embodiment, $R_1$ and $R_2$ are n-pentyl groups.
In one embodiment, $R_3$ and $R_4$ are methyl groups.
In one embodiment, $R_1$ and $R_2$ are n-butyl groups and $R_3$ and $R_4$ are methyl groups.
In one embodiment, $R_1$ and $R_2$ are n-pentyl groups and $R_3$ and $R_4$ are methyl groups.

As noted above, the alkoxysilane composition useful in the method of the invention includes a dialkoxysilane. Representative dialkoxysilanes include dibutoxysilanes and dipentoxysilanes. The alkoxysilane of the composition is hydrolyzable in the void volume of the cable. Suitable dibutoxysilanes include di(n-butoxy)silanes, di(s-butoxy)silanes, and di(i-butoxy)silanes. Suitable dipentoxysilanes include di(n-pentoxy)silanes, di(s-butoxy)silanes, and di(i-butoxy)silanes.

In one embodiment, the alkoxysilane useful in the method of the invention is a dialkyldialkoxysilane. In one embodiment, the dialkyldialkoxysilane is a dialkyldibutoxysilane. In one embodiment, the dialkyldialkoxysilane is a dialkyldipentoxysilane.

Representative dialkyldialkoxysilanes useful in the method of the invention include dimethyldibutoxysilanes, diethyldibutoxysilanes, dipropyldibutoxysilanes, dimethyldipentoxysilanes, diethyldipentoxysilanes, and dipropyldipentoxysilanes. It will be appreciated that that the butoxysilanes can be n-butoxysilanes, s-butoxysilanes, and i-butoxysilanes, and that the pentoxysilanes can be n-pentoxysilanes, s-pentoxysilanes, and i-pentoxysilanes.

In one embodiment, the alkoxysilane is an aryl dialkoxysilane. Representative aryl dialkoxysilanes include phenylmethyldibutoxysilanes, phenylmethyldipentoxysilanes, diphenyldibutoxysilanes, and diphenyldipentoxysilanes. It will be appreciated that that the butoxysilanes can be n-butoxysilanes, s-butoxysilanes, and i-butoxysilanes, and that the pentoxysilanes can be n-pentoxysilanes, s-pentoxysilanes, and i-pentoxysilanes.

In one embodiment, the alkoxysilane composition includes dimethyldi(n-butoxy)silane (DMDB). In one embodiment, the alkoxysilane composition includes dimethyldi(n-pentoxy)silane (DMDPt).

The alkoxysilanes useful in the invention can be made by treating a suitably reactive silane (e.g., dimethyldichlorosilane, phenylmethyldichlorosilane, diphenyldichlorosilane) with excess alcohol (e.g., a butanol or a pentanol). Removal of excess alcohol by distillation provides the dialkoxysilane product. Dimethyldi(n-butoxy)silane is commercially available (Geleste, Morristown, Pa.).

The alkoxysilane composition useful in the method of invention can further include a hydrolysis catalyst to render the alkoxysilane reactive to water in the interstitial void volume of the cable, thereby rendering the alkoxysilane more readily hydrolyzable. Suitable catalysts include, but are not limited to, tetra(isopropyl) titanate (TiPT). The catalyst is present in the alkoxysilane composition in an amount from about 0.1 to about 0.3 percent by weight based on the total weight of the composition.

In one embodiment, the alkoxysilane composition further includes a dye. The dye is a non-functional dye and is used in the composition to permit visual determination of excess alkoxysilane composition supplied to the cable. Suitable dyes include, but are not limited to, Morplas Blue commercially available from Sun Belt Chemicals (Rock Hill, N.C.). The dye is present in the alkoxysilane composition in an amount from about 0.01 to about 0.05 percent by weight based on the total weight of the composition.

As noted above, the alkoxysilane composition useful in the method of the invention includes an alkoxysilane that is hydrolyzable to produce a final mixture including an alcohol that is non-corrosive to the central conductor at temperatures up to and including about 100° C. As used herein, the term "non-corrosive" refers to the lack of corrosive effect on the central conductor of an in-service solid dielectric shielded electrical cable by the alcohol produced by the hydrolysis of the alkoxysilane supplied to the interstitial void volume in the region of the conductor. An alcohol is determined to be "non-corrosive to the central conductor" at a specified temperature when aluminum conductor material is subjected to a mixture of the alkoxysilane and the alcohol produced by the hydrolysis of the alkoxysilane in quantities that might be reasonably expected to occur in a cable environment at the maximum cable operating temperatures specified and for a specified time when no corrosion, pitting, mass loss, gas evolution, or solution color change is observed in a laboratory corrosion test.

A method for determining whether an alcohol is non-corrosive to the central conductor is described in the Example. The Example describes a corrosion test method and results for dimethyldimethoxysilane (DMDM), dimethyldiethoxysilane (DMDE), dimethyldi(n-propoxy)silane (DMDPr), dimethyldi(n-butoxy)silane (DMDB), and dimethyldi(n-pentoxy)silane (DMDPt), which on hydrolysis produce methanol, ethanol, n-propanol, n-butanol, and n-pentanol, respectively.

The results clearly show that significant corrosion of the aluminum conductor occurs in the presence of methanol and ethanol, some corrosion occurs in the presence of n-propanol, and no measurable corrosion occurs in the presence of n-butanol or n-pentanol.

The results demonstrate that methanol, ethanol, and propanol are corrosive to the aluminum conductor at temperatures up to and including 100° C. Accordingly, alkoxysilanes that hydrolyze to produce methanol, ethanol, or propanol will be corrosive to the aluminum conductor of an electrical cable under conditions of use.

The results also demonstrate that n-butanol and n-pentanol are not corrosive to the aluminum conductor at temperatures up to and including 100° C. Accordingly, alkoxysilanes that hydrolyze to produce n-butanol or n-pentanol will not be corrosive to the aluminum conductor of an electrical cable under conditions of use.

In another aspect, the invention provides an alkoxysilane composition useful in enhancing the dielectric strength of an in-service solid dielectric shielded electrical cable while at the same time preventing corrosion of the cable's central aluminum conductor. The alkoxysilane composition includes an alkoxysilane that is hydrolyzable in the interstitial void volume in the region of the conductor or in the polymer insulation to produce an alcohol that is non-corrosive to the central conductor at temperatures up to an including about 100° C. In one embodiment, the alkoxysilane is a dialkyldialkoxysilane. In one embodiment, the alkoxysilane is an aryl dialkoxysilane.

Suitable dialkyldialkoxysilanes include dibutoxysilanes and dipentoxysilanes. Representative dibutoxysilanes include dimethyldibutoxysilanes, diethyldibutoxysilanes, and dipropyldibutoxysilanes. Representative dialkyldipentoxysilanes include dimethyldipentoxysilanes, diethyldipentoxysilanes, and dipropyldipentoxysilanes. It will be appreciated that that the butoxysilanes can be n-butoxysilanes, s-butoxysilanes, and i-butoxysilanes, and that the pentoxysilanes can be n-pentoxysilanes, s-pentoxysilanes, and i-pentoxysilanes.

Suitable aryl dialkoxysilanes include phenylmethyldibutoxysilanes, phenylmethyldipentoxysilanes, diphenyldibutoxysilane, and diphenyldipentoxysilane. It will be appreciated that that the butoxysilanes can be n-butoxysilanes, s-butoxysilanes, and i-butoxysilanes, and that the pentoxysilanes can be n-pentoxysilanes, s-pentoxysilanes, and i-pentoxysilanes.

The alkoxysilane composition useful in the method of invention can further include a hydrolysis catalyst to render the alkoxysilane reactive to water in the interstitial void volume of the cable, thereby rendering the alkoxysilane more readily hydrolyzable. Suitable catalysts include tetra(isopropyl) titanate (TiPT).

In one embodiment, the alkoxysilane composition further includes a dye. The dye is a non-functional dye and is used in the composition to permit visual determination excess alkoxysilane composition supplied to the cable.

The following example is provided for illustrating, not limiting, the invention.

EXAMPLE

Corrosion Test Method and Results for Alkoxysilane Compositions

In this example, corrosion of the central aluminum conductor of an electrical cable by alkoxysilane fluids is described.

The method for determining corrosion (conductor mass loss) was as follows.

Strand preparation. Strands from field-aged cable (150 $mm^2$ conductor with 30 aluminum strands) were cut into 2 inch lengths (–/+ 1/16 inch). The strands were prepared for testing by rinsing with nitric acid and then drying the strands according to ASTM GI. The dried strands were then weighed and immersed in the test fluid within 2 hours of cleaning.

Fluid preparation. Test fluid (alkoxysilane) (150 g) was added to a clean, dried 500 mL PYREX Erlenmeyer flask. TiPT catalyst was added to the test fluid to provide a catalyst concentration of 0.2% by weight. The mixture of test fluid and catalyst was swirled for 1 minute to ensure mixing. Add the alcohol (5 or 10% by weight) to the mixture of test fluid and catalyst and swirl for 1 minute to effect mixing.

Test Procedure. Add the strands prepared as described above to the flasks containing test fluid, catalyst, and alcohol mixture such that the strands are submerged in the mixture. Seal the flask with a stopper modified to include a reflux condenser. Submerge the flask in an oil bath such that the level of oil in the bath matches the level of fluid in the flask. Heat the contents of the flask in an oil bath at 100° C. (or at the boiling point of the fluid mixture if less than 100° C.) for 250 hours (8 hours a day). After heating for 250 hours, remove the strands from the flasks, clean the strands according to ASTM G1, and weigh within 2 hours.

Test Results. The loss of mass from the strands tested as described above was recorded and the results tabulated in Table 1. The mass loss values in the table represent the average of three runs (triplicate), except for dimethyldimethoxysilane (DMDM) (5% methanol) and dimethyldi(n-pentoxy)silane (DMDPt) were conducted in duplicate. In Table 1, "DMDM" refers to dimethyldimethoxysilane, "DMDE" refers to dimethyldiethoxysilane, "DMDPr" refers to dimethyldi(n-propoxy)silane, "DMDB" refers to dimethyldi(n-butoxy)silane, and "DMDPt" refers to dimethyldi(n-pentoxy)silane. Mass Loss/Day was calculated based on Total Mass Loss.

Dimethyldimethoxysilane (DMDM) and dimethyldiethoxysilane (DMDE) were obtained from commercial sources (e.g., Dow Corning, Midland, Mich.; Geleste, Morristown, Pa.). Dimethyldi(n-propoxy)silane (DMDPr) and dimethyldi(n-pentoxy)silane (DMDPt) were prepared as described above by reaction of dimethyldichlorosilane with n-propanol and n-pentanol, respectively. Dimethyldi(n-butoxy)silane (DMDB) was obtained from Geleste, Morristown, Pa.

TABLE 1

Comparison of Mass Loss for Alkoxysilane Fluids.

| Test Fluid | Alcohol (%) | Mass Loss Total (%) | Mass Loss/Day (%) |
|---|---|---|---|
| DMDM** | methanol 5% | 0.85 | 0.08 |
| DMDM | methanol 10% | 12.87 | 1.24 |
| DMDE* | ethanol 5% | 7.24 | 4.20 |
| DMDE* | ethanol 10% | 11.42 | 9.76 |
| DMDPr | n-propanol 10% | 0.47 | 0.04 |
| DMDB | n-butanol 5% | 0.00 | 0.00 |
| DMDB | n-butanol 10% | 0.00 | 0.00 |
| DMDPt** | n-pentanol 10% | 0.00 | 0.00 |

*Experiments reached completion and removed before 250 hours.
**Average of 2 runs.

As clearly shown in Table 1, significant corrosion of the aluminum conductor occurs in the presence of methanol and ethanol, some corrosion occurs in the presence of n-propanol, and no measurable corrosion occurs in the presence of n-butanol or n-pentanol.

The results demonstrate that methanol, ethanol, and propanol are corrosive to the aluminum conductor at temperatures up to and including 100° C. Accordingly, alkoxysilanes that hydrolyze to produce methanol or ethanol will be corrosive to the aluminum conductor of an electrical cable under conditions of use.

The results also demonstrate that n-butanol and n-pentanol are not corrosive to the aluminum conductor at temperatures up to and including 100° C. Accordingly, alkoxysilanes that hydrolyze to produce n-butanol and n-pentanol will not be corrosive to the aluminum conductor of an electrical cable under conditions of use.

While illustrative embodiments have been illustrated and described, it will be appreciated that various changes can be made therein without departing from the spirit and scope of the invention.

The embodiments of the invention in which an exclusive property or privilege is claimed are defined as follows:

1. A method for enhancing the dielectric strength of an in-service solid dielectric shielded electrical cable and preventing corrosion of an aluminum central conductor encased in an insulation jacket and having an interstitial void volume in the region of the conductor, comprising:

supplying the interstitial void volume with an alkoxysilane composition comprising a dialkoxysilane having the formula:

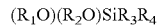

$(R_1O)(R_2O)SiR_3R_4$ wherein $R_1$ and $R_2$ are independently selected from the group consisting of $C_4$ and $C_5$ alkyl groups; and wherein $R_3$ and $R_4$ are independently selected from the group consisting of $C_1$ alkyl, $C_2$ alkyl, and $C_3$ alkyl.

2. The method of claim 1, wherein the composition further comprises a hydrolysis catalyst.

3. The method of claim 1, wherein the composition further comprises a non-functional dye.

4. The method of claim 1, wherein the $C_4$ alkyl group is selected from the group consisting of n-butyl, s-butyl, and i-butyl groups.

5. The method of claim 1, wherein the $C_5$ alkyl group is selected from the group consisting of n-pentyl, s-pentyl, and i-pentyl groups.

6. The method of claim 1, wherein $R_1$ and $R_2$ are n-butyl groups.

7. The method of claim 1, wherein $R_1$ and $R_2$ are n-pentyl groups.

8. The method of claim 1, wherein the dialkoxysilane is a dialkyldibutoxysilane.

9. The method of claim 1, wherein the dialkoxysilane is selected from the group consisting of a dimethyldibutoxysilane, a diethyldibutoxysilane, and a dipropyldibutoxysilane.

10. The method of claim 1, wherein the dialkoxysilane is dimethyldi(n-butoxy) silane.

11. The method of claim 1, wherein the dialkoxysilane is a dialkyldipentoxysilane.

12. The method of claim 1, wherein the dialkoxysilane is selected from the group consisting of a dimethyldipentoxysilane, a diethyldipentoxysilane, and a dipropyldipentoxysilane.

13. The method of claim 1, wherein the dialkoxysilane is dimethyldi(n-pentoxy) silane.

14. A method for enhancing the dielectric strength of an in-service solid dielectric shielded electrical cable and preventing corrosion of an aluminum central conductor encased in an insulation jacket and having an interstitial void volume in the region of the conductor, comprising supplying the interstitial void volume with an alkoxysilane composition comprising a dialkoxysilane selected from the group consisting of a dimethyldibutoxysilane and a dimethyldipentoxysilane.

15. The method of claim 14, wherein the dialkoxysilane is dimethyldi(n-butoxy) silane.

16. The method of claim 14, wherein the dialkoxysilane is dimethyldi(n-pentoxy) silane.

17. The method of claim 14, wherein the composition further comprises a hydrolysis catalyst.

18. The method of claim 14, wherein the composition further comprises a non-functional dye.

* * * * *